(No Model.)
W. B. MASON.
FLUID PRESSURE REGULATOR.
No. 367,536. Patented Aug. 2, 1887.
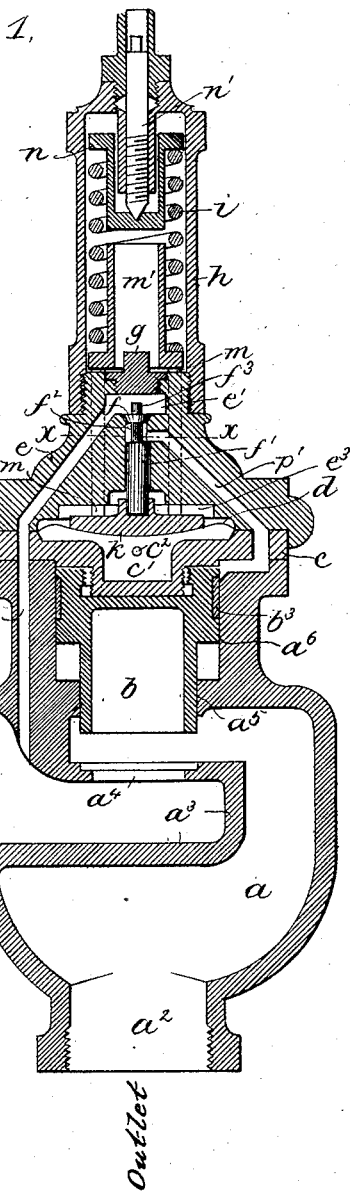
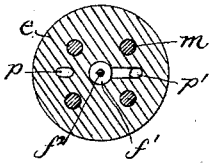
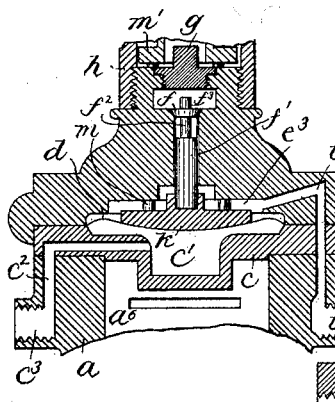
Witnesses,
J. J. Maloney
H. P. Bates
Inventor,
William B. Mason,
by Jos. P. Livermore
Att'y.

UNITED STATES PATENT OFFICE.

WILLIAM B. MASON, OF BOSTON, MASSACHUSETTS, ASSIGNOR TO THE MASON REGULATOR COMPANY, OF SAME PLACE.

FLUID-PRESSURE REGULATOR.

SPECIFICATION forming part of Letters Patent No. 367,536, dated August 2, 1887.

Application filed March 8, 1886. Serial No. 194,479. (No model.)

*To all whom it may concern:*

Be it known that I, WILLIAM B. MASON, of Boston, county of Suffolk, State of Massachusetts, have invented an Improvement in Fluid-Pressure Regulators, of which the following description, in connection with the accompanying drawings, is a specification, like letters on the drawings representing like parts.

My invention relates to a fluid-pressure regulator of that class in which a main valve or equivalent device is operated by a piston, itself controlled by a secondary valve governed by changes in the pressure of the fluid, in accordance with which pressure the main valve or equivalent device is to be regulated. An example of the pressure-regulator of this general class is shown in Letters Patent No. 234,086, granted to me January 12, 1886, to which reference may be had; and I do not claim, broadly, a pressure-regulating device comprising a valve or other device to be operated in accordance with changes in the pressure of a fluid having variable pressure, and an actuating-piston for the said device, and a valve controlling the operation of the said piston, and being itself controlled by the pressure of the fluid in accordance with which the apparatus is to operate.

The present invention consists, mainly, in a novel arrangement of the pressure-chamber and diaphragm or other device operated in accordance with changes in pressure of the fluid in the said chamber with relation to the secondary valve and its stem or actuating mechanism, which is, in accordance with this invention, wholly outside of the pressure-chamber, instead of, as heretofore, passing through the said pressure-chamber and being exposed to the action of the fluid therein; and the invention further consists in a novel arrangement of parts and in various details of construction, hereinafter specified, by which apparatus of this general class is made more certain in operation. As shown in the former patent referred to, the cylinder or chamber in which the actuating-piston works was below the pressure-chamber containing the fluid under variable pressure, and the stem of the controlling-valve worked in a passage leading from the pressure-chamber to the said cylinder; and all other pressure-regulating devices heretofore made, so far as I know, have had the same general arrangement, so far as the relation of the secondary or controlling valve to the pressure-chamber is concerned. In the present invention the controlling-valve is shown as operated by a diaphragm, forming one side of the pressure-chamber, and the valve-stem is on the opposite side of the diaphragm from the chamber, so that it is not exposed to the fluid in the pressure-chamber, and can, consequently, never be affected by the said fluid or by sedimentary or gritty matter which may be contained in the said fluid. The ports governed by the controlling-valve, through which the actuating-fluid is admitted to or escapes from the cylinder in which the main piston works, pass around the pressure-chamber, and the diaphragm is acted upon on the side opposite to that exposed to the variable fluid-pressure, by a constant governing force derived from a weight or spring which surmounts the chamber in which the secondary valve works, and is caused by suitable devices to act on the diaphragm.

Figure 1 is a longitudinal section of a pressure-regulator embodying this invention; Fig. 2, a partial sectional detail on a plane at right angles to that of Fig. 1; and Fig. 3, a transverse section on line $x\,x$, Fig. 1.

The invention is shown embodied in an apparatus intended to control a steam-pump or similar fluid-forcing apparatus in accordance with the pressure of the fluid forced by it. When used for this purpose, the apparatus comprises a valve-shell, $a$, having an inlet-opening, $a'$, and outlet-opening $a^2$, separated by a partition, $a^3$, containing an opening, $a^4$, surrounded by a valve-seat, controlled by the main valve, shown as a differential piston, $b$, having its portion of smaller area working in a cylindrical passage, $a^5$, above the valve-seat and its larger portion working in a cylinder, $a^6$, of larger diameter formed in the upper part of the shell $a$. The piston or valve $b$ when seated is exposed at its smaller end to the pressure of the fluid entering the valve-shell through the passage $a'$, and when there is no opposed pressure acting on the larger area, it will be raised by the said fluid, thus forming the main valve, as shown in Fig. 1, and permitting steam to pass therethrough to the engine or pump, which will thus be maintained in operation as long as there is no pressure on the larger area of the piston $b$. The valve-shell is surmounted by a plate or cap, $c$, preferably recessed, as shown at $c'$, and forming the lower part of the pressure-chamber, the said cap itself being surmounted by a flexible diaphragm, $d$, which may be of sheet metal, and which is confined at its edges between the cap $c$ and a piece, $e$, that is bolted to the shell $a$, thus fastening the cap $c$ and diaphragm securely in place. The diaphragm $d$ thus forms a movable wall of the pressure-chamber, which is moved by changes in pressure of the fluid in the said chamber. The piece $e$ contains a recess, $e'$, which forms a chamber for the controlling-valve $f$, and which is closed at its top by a plug, $g$, and also has secured to it the spring-chamber $h$, containing the spring $i$, that affords the constant governing force, which, in connection with the variable pressure of the fluid entering the pressure-chamber $e'$, governs the operation of the apparatus. The diaphragm $d$ supports a rigid head, $k$, provided with a socket, which receives the stem $f'$ of the secondary valve, and which is also acted upon by rods $m$, passing with a loose fit through openings in the piece $e$ and acted upon by a follower, $m'$, which receives one end of the spring $i$. The other end of the spring $i$ bears upon another follower, $n$, controlled by an adjusting-screw, $n'$, by means of which the tension of the spring may be varied to adjust the constant-governing force of the apparatus.

The pressure-chamber is provided with an inlet-opening, $c^2$, having a mouth, $c^3$, (shown in Fig. 2,) to which a pipe may be attached, and through which the fluid having the variable pressure is admitted to the pressure-chamber, so as to act on the under surface of the diaphragm $d$, tending to move it and the head $k$ upward against the pressure of the spring $i$, transmitted through the rod $m$ to the head $k$. The said pressure-chamber has no outlet, and the fluid in it has no circulation, so that little, if any, of gritty or sedimentary material can get into the chamber, and if any does get in it will have no detrimental effect on the operation of the apparatus.

If desired, the chamber may be filled with oil, glycerine, or other suitable fluid which will transmit the variable fluid-pressure to the diaphragm.

The chamber $e'$ of the secondary valve $f$ has an inlet-port, $p$, shown as communicating with the inlet portion of the valve-shell $a$, so that fluid is admitted to the said chamber $e'$ at the same pressure as that which acts on the smaller end of the piston $b$. The valve $f$ controls the passage of fluid from the chamber $e'$ into the inlet-port $p'$ to the cylinder $a^6$, above the larger portion of the piston $b$, so that when the said valve is open, fluid is admitted from the inlet portion of the shell $a$ through ports $p\ p'$, to act on the upper larger area of the piston $b$ in the opposite direction to that acting on the lower area thereof, and, being the same amount per unit of area, it causes the piston $b$ to move downward until its lower end seats over the opening $a^4$, thus preventing further flow of fluid through the valve-shell $a$.

The stem $f'$ of the valve $f$ is reduced in diameter, as shown at $f^2$, just below the valve $f$ and opposite the mouth of the port $p'$, so that when the valve $f$ is raised the fluid passes from the chamber $e'$ around the reduced portion $f^2$ of its stem into the port $p'$, and the said stem is also extended above the valve, forming a stop portion, $f^3$, that by its engagement with the plug $g$ limits the upward movement of the valve and of the diaphragm $d$; and it will be seen that only an extremely small movement of the diaphragm is necessary to open the valve $f$ and admit the fluid to act on the larger area of the piston $b$, so that only an extremely small compression of the spring $i$ is required, and consequently an extremely small increase of the pressure in the pressure-chamber above that which is sufficient to just balance the force of the spring $i$ as set by its adjusting device $n\ n'$. The stem $f'$ has a loose fit in its passage in the piece $e$, so that when seated the fluid can escape from the cylinder $a^6$ above the piston, through the port $p'$, and down around the stem $f'$ into the space or exhaust-chamber $e^3$ above the diaphragm $d$, from which chamber there is an exhaust port or outlet, $t$, having a threaded mouth, $t'$, in the shell $a$, to which the pipe may be attached for conveying the exhaust-fluid to any desired point. The piston $b$ is shown as made hollow for the purpose of lightening it, and its larger portion is provided with a packing-ring, $b^3$, and also has an internal threaded recess, which may be used to connect it with a chuck in the operation of turning it, and the cap-piece $c$ has the outer part of the depression $c'$ externally threaded for the purpose of connecting it with the chuck in the operation of making the parts.

All the piping that is necessary for the operation of the apparatus is connected with the shell $a$, and all the working parts are accessible by removing the piece $e$ and cap $c$, which can be done without disturbing any of the pipe-connections made with the shell $a$. The follower $m'$ has a long tubular neck to engage the interior of the spring $i$, which thus serves to guide it, and the follower $n$ is depressed or made cup-shaped, so that the adjusting-screw $n'$, although varying the action on the upper end of the spring, extends a considerable distance into the spring, thus economizing space in the apparatus.

A pressure-regulator made as described may be used for any purpose in which a device of any kind which may be actuated by a piston is to be moved or have its condition changed upon the rise and fall of the pressure of a fluid having variable pressure above and below a given point, and the operation is as follows: When the pressure of the fluid in the pressure-chamber rises to such a point that in acting on the diaphragm it overcomes the force of the spring $i$, it raises the diaphragm, opens the valve $f$, and admits fluid through the ports $p$ $p'$ to act on the larger portion of the piston $b$, thus moving it in the direction from the larger to the smaller end, and when the pressure in the chamber falls below this point, the spring $i$ moves the diaphragm downward, permitting the valve $f$ to close, so that fluid is no longer admitted to act on the larger area of the piston $b$, but is exhausted through the ports $p$ and $t$, and the pressure, acting unbalanced on the smaller area of the piston $b$, moves it in the opposite direction to that last mentioned—namely, from the smaller toward the larger port. This movement of the piston may be employed to control a valve or damper or any other device that is to depend for its operation upon the change of pressure of the fluid having variable pressure.

It is obvious that a pressure-regulator might be constructed, as herein shown, in which the piece $k$ would constitute the movable wall of the pressure-chamber and work as a piston in a cylinder formed either in the piece $c$ or $e$, above the inlet $c^2$, to the pressure-chamber, which would have the advantage that the valve-stem $f$ would not be exposed to the action of the fluid in the pressure-chamber; but it is preferable to employ a diaphragm, as shown, so that there will be no surfaces having a frictional movement with relation to one another exposed to the fluid in the pressure-chamber.

I claim—

1. The combination of the cylinder and actuating-piston therein with a cap closing one end of the said cylinder and forming a portion of a pressure-chamber, a diaphragm controlled by the pressure of the fluid in the said pressure chamber, a controlling-valve actuated by said diaphragm and located on the opposite side thereof from the pressure-chamber, and ports communicating with the cylinder of the actuating-piston controlled by the said valve, substantially as described.

2. A main valve comprising a valve shell, a movable valve controlling the flow of fluid therethrough, and a differential cylinder and piston therein having its smaller area exposed to the pressure of the fluid in the valve shell, a cap closing the larger end of the differential cylinder and forming a portion of a pressure-chamber, a movable device actuated by the fluid in said pressure-chamber, and a controlling-valve operated by said device and located on the opposite side thereof from the pressure-chamber, and ports leading from the main valve-shell to the larger portion of the differential cylinder controlled by the said controlling-valve, substantially as described.

3. The main shell containing a differential cylinder and piston therein, combined with the cap closing the larger end of the said cylinder and forming one portion of the pressure-chamber, a piece surmounting the said cap containing a valve-chamber provided with a valve-seat, a controlling-valve therein, and ports communicating with the differential cylinder governed by said controlling-valve, a spring or equivalent surmounting the said piece, and rods extending from said spring through said piece toward the pressure-chamber, and a movable device in the pressure-chamber actuating the controlling-valve and itself controlled by the opposed forces derived from the spring $f$ on one side and the pressure of the fluid in the pressure-chamber on the other side, substantially as described.

4. The combination of the main shell provided with a cylinder and piston therein with a cap, $c$, forming one end of the said cylinder, the piece $e$, surmounting the said cap and provided with ports communicating with the said cylinder and with a valve-seat, the diaphragm secured at its edges between the parts $c$ and $e$ and provided with a rigid head, $k$, and the controlling-valve co-operating with the valve-seat in the piece $e$ and having its stem fitted in a socket in the head $k$, substantially as described.

5. The main shell provided with a cylinder and piston therein, combined with the cap $c$, forming one end of the said cylinder, the piece $e$, surmounting the said cap and provided with ports and a valve-chamber, the plug $g$, closing the valve-chamber, and the spring-chamber and spring therein surmounting the piece $e$, a diaphragm secured at its edges between the parts $c$ and $e$, rods extending from the spring-chamber to the diaphragm, and the controlling-valve in the piece $e$, operated by the diaphragm, substantially as described.

6. The combination of the main piston and cylinder with the pressure-chamber and movable device controlled by the pressure of fluid therein, with the spring and follower at one end, from which its force is transmitted to the said movable device, and follower at the other end of the spring extending into the interior thereof, and adjusting-screw bearing on the said follower at a point between the ends of the spring, substantially as described.

7. The main shell provided with a cylinder and piston therein, combined with the piece $e$, the diaphragm having a pressure-chamber below and an exhaust-chamber above it and provided with a valve-seat and ports communicating with the said cylinder, and the valve co-operating with the said seat and ports, and its stem having a loose fit in a passage in the piece $c$, communicating with the exhaust-chamber above the diaphragm, substantially as and for the purpose described.

8. The main shell provided with a cylinder and piston therein, combined with a cap, $c$, forming one end of the said cylinder, the piece $e$, surmounting the said cap and provided with ports and a valve-seat, a diaphragm secured at its edges between the parts $c$ and $e$, and the controlling-valve co-operating with the said ports and valve-seat and actuated by the said diaphragm, and the projection $f^3$, constituting a stop for the said valve, substantially as described.

9. In a fluid-pressure regulator, a main valve and secondary valve controlling the movement of said main valve, and a pressure-chamber and movable device forming one wall of the said chamber, and being operated by changes in pressure of the fluid in the pressure-chamber, the secondary valve being operated by the said movable device and engaged therewith on the opposite side from the said chamber, whereby exposure of the said valve to contact with the said fluid is avoided, substantially as described.

10. The combination of a cylinder and actuating piston therein, and a pressure-chamber with a diaphragm controlled by the pressure of fluid in said chamber, and a controlling or secondary valve actuated by the said diaphragm and located on the opposite side thereof from the pressure-chamber, substantially as and for the purpose described.

In testimony whereof I have signed my name to this specification in the presence of two subscribing witnesses.

WM. B. MASON.

Witnesses:
   JOS. P. LIVERMORE,
   JAS. J. MALONEY.